(12) United States Patent
Miyairi et al.

(10) Patent No.: US 8,093,173 B2
(45) Date of Patent: Jan. 10, 2012

(54) HONEYCOMB CATALYTIC ARTICLE

(75) Inventors: Yukio Miyairi, Nagoya (JP); Takashi Mizutani, Tokoname (JP); Takuya Hiramatsu, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 49 days.

(21) Appl. No.: 12/686,417

(22) Filed: Jan. 13, 2010

(65) Prior Publication Data

US 2010/0184589 A1    Jul. 22, 2010

(30) Foreign Application Priority Data

Jan. 22, 2009   (JP) ................ 2009-012167

(51) Int. Cl.
- *B01J 27/224* (2006.01)
- *B01J 21/04* (2006.01)
- *B01J 23/02* (2006.01)
- *B32B 3/12* (2006.01)
- *B01D 39/06* (2006.01)
- *B01D 39/20* (2006.01)

(52) U.S. Cl. ............. 502/178; 502/439; 502/527.11; 502/527.18; 429/116; 429/117; 55/523

(58) Field of Classification Search ........... 502/178, 502/439, 527.11, 527.18; 428/116, 117; 55/523

See application file for complete search history.

(56) References Cited

U.S. PATENT DOCUMENTS

| | | | |
|---|---|---|---|
| 4,118,199 A | 10/1978 | Völker et al. | |
| 4,253,992 A * | 3/1981 | Soejima et al. | 502/251 |
| 4,849,275 A * | 7/1989 | Hamaguchi et al. | 428/116 |
| 7,250,385 B1 * | 7/2007 | Ohno et al. | 502/178 |
| 7,524,350 B2 * | 4/2009 | Kunieda | 55/523 |
| 7,625,529 B2 * | 12/2009 | Ohno et al. | 422/180 |
| 7,754,160 B2 * | 7/2010 | Miyairi et al. | 422/180 |
| 7,846,526 B2 * | 12/2010 | Kunieda | 428/116 |
| 7,867,598 B2 * | 1/2011 | Miyairi et al. | 428/116 |
| 7,887,761 B2 * | 2/2011 | Takahashi et al. | 422/180 |
| 2003/0176280 A1 * | 9/2003 | Caze et al. | 502/439 |
| 2009/0246453 A1 * | 10/2009 | Yamaguchi | 428/116 |

FOREIGN PATENT DOCUMENTS

| | | |
|---|---|---|
| EP | 1 985 352 A2 | 10/2008 |
| EP | 2 158 956 A1 | 3/2010 |
| JP | 2003-293730 A1 | 10/2003 |

* cited by examiner

*Primary Examiner* — Patricia L Hailey
(74) *Attorney, Agent, or Firm* — Burr & Brown (57) ABSTRACT

There is provided a honeycomb structure where a catalyst is loaded on surfaces of inner pores of the surface layer and on a surface of the surface layer; a relation between a catalyst area proportion A of the catalyst to a gap area proportion B of a gap in a cross-section of the surface layer on the inlet side is 1%<A/B<90%; and a relation between an average catalyst area proportion, A1, from the surface to a point having a depth of one third of the thickness of the surface layer including the surface of the surface layer on the inlet side and a catalyst area proportion A2 in a central portion of the surface layer is A1/A2>1.5.

20 Claims, 4 Drawing Sheets

HONEYCOMB CATALYTIC ARTICLE

BACKGROUND OF THE INVENTION

The present invention relates to a honeycomb catalytic article for trapping particulate matter in exhaust gas.

In consideration of the influences on the environment, there is increased need to remove particulate matter contained in exhaust gas discharged from internal combustion engines such as an automobile engine, a construction machine engine, and a stationary engine for industrial machines; burning appliances, and the like. In particular, regulations regarding the removal of particulate matter (PM) discharged from a diesel engine tend to be strengthened on a global basis. From such circumstances, a diesel particulate filter (DPF) for trapping and removing PM is in the spotlight.

As a mode for a DPF, there is a honeycomb filter provided with a porous partition wall matrix separating and forming a plurality of cells functioning as fluid passages, where predetermined cells each of which has an open end portion on one side and a plugged end portion on the other side and remaining cells each of which has a plugged end portion on the one side and an open end portion on the other side are alternately disposed, and a fluid (exhaust gas) flowing in from the end portion on the one side where the predetermined cells are open passes through the partition walls, flows out on the remaining cell side as a permeated fluid, and further flows out from the other end portion on the other side where the remaining cells are open, thereby trapping and removing PM in exhaust gas. Since a filter (wall-flow type filter) having a structure where exhaust gas permeates porous partition walls like the above honeycomb filter can have a large filtration area, filtration flow rate (partition wall permeation flow rate) can be made low, and pressure loss is small with relatively good trapping efficiency of particulate matter. The particulate matter depositing on the DPF contains carbon as the main component, and there is employed a method for oxidizing and removing fine particle substances depositing with a certain period by sending high temperature gas containing oxygen or oxygen and nitrogen dioxide into the DPF. In order to perform it effectively, it is known that loading of a catalyst inside partition wall pores and on the surface of the partition walls of the DPF is helpful (see, e.g., JP-A-2003-293730).

However, a DPF where such a honeycomb filter is applied has the following problems to be solved.

(a) When trapping of PM is started in a clean state, PM enters pores of the porous partition walls in the first place to be in a state of deep bed filtration where PM is trapped inside the partition walls and a state of surface filtration where PM is trapped on the surface of the partition walls. After the PM deposits on a surface of the partition walls, the filtration is moved to a cake filtration where the PM forms a layer functioning as a filter. In such a filtration process, PM deposits inside (in pores of) the partition walls in the initial deep bed filtration stage. Therefore, right after the start of trapping PM, substantial porosity of the partition walls may fall to speed up the flow rate of exhaust gas passing through the partition walls, and thereby pressure loss may rapidly rise. Such rapid rise in pressure loss right after the start of trapping PM is not preferable because it causes deterioration in engine performance.

(b) In a DPF, it is necessary to combust and remove PM for regeneration when a certain amount of PM is trapped and deposited. In this case, generally, the amount of deposited PM is estimated from the pressure loss. However, in a DPF having such a conventional partition wall pore structure, since only PM deposited in pores is naturally combusted, pressure loss has hysteresis with respect to the whole PM deposition amount, and it is impossible to estimate the PM amount with high accuracy on the basis of pressure loss.

(c) A DPF having smaller pore sizes of the partition walls and thicker partition walls can trap PM more effectively. In addition, a smaller pore size of the partition walls is preferable in order to inhibit entry of PM into the partition walls (pores) and move the filtration to the cake filtration early. However, it is not desirable to reduce the pore size of the partition walls and increase the thickness of the partition walls because it causes increase of pressure loss of the partition walls themselves before PM deposition to deteriorate engine performance.

(d) In a DPF, there is a case of employing two-layer structure where a surface layer is formed on the porous partition wall matrix. However, conventionally, there is a case that the surface layer is peeled to deteriorate filtration accuracy.

(e) In a DPF, there are cases that a catalyst is loaded in pores of the partition walls and on a surface of the partition walls to raise the PM oxidation rate, that PM oxidation initiation temperature is lowered to reduce the PM deposition amount, and that regeneration time is shorten, or regeneration temperature is lowered to save fuel. However, since there are many cases that the PM (fine particle substance) deposits more on the inlet side of the partition walls without reaching the vicinity of the surface on the outlet side. Therefore, a catalyst in the partition walls cannot be used effectively.

(f) When a catalyst layer is formed only on the partition wall surface layer in order to solve the problem of (e), partition wall passage resistance of gas increases too much to cause increase in pressure loss in the DPF. As a result, deteriorations in engine output and fuel cost performance occur.

SUMMARY OF THE INVENTION

The present invention has been made by repeated studies in order to solve such problems and aims to provide a DPF where, in addition to good PM trapping efficiency and small pressure loss upon PM deposition, no rapid rise of pressure loss right after the start of trapping PM (initial stage of PM deposition) is caused (solution to the aforementioned problems (a) and (f)), the relation between PM deposition amount and pressure loss has no hysteresis characteristic (solution to the aforementioned problem (b)), pressure loss in an early stage having no PM deposition is suppressed low (solution to the aforementioned problem (c)), the surface layer is hardly peeled off (solution to the aforementioned problem (d)), and the whole catalyst is effectively used for the PM oxidation treatment (solution to the aforementioned problem (e)).

That is, according to the present invention, there is provided the following honeycomb catalytic article.

[1] A honeycomb catalytic article comprising partition walls having:

a porous partition wall matrix separating and forming a plurality of cells functioning as fluid passages, and a surface layer provided on only the inflow side or each of the inflow side and the outflow side of the partition wall matrix;

with predetermined cells each of which has an open end portion on one side and a plugged end portion on the other side and remaining cells each of which has a plugged end portion on the one side and an open end portion on the other side being alternately disposed, and a catalyst being loaded on surfaces of inner pores of the surface layer and on a surface of the surface layer;

wherein a relation between a catalyst area proportion A of the catalyst to a gap area proportion B of a gap in a cross-section of the surface layer on the inlet side is 1%<A/B<90% in a central portion in a thickness direction of the surface layer, and a relation between an average catalyst area proportion A1 from the surface to a point having a depth of one third of the thickness of the surface layer including the surface of the surface layer on the inlet side and a catalyst area proportion A2 in a central portion of the surface layer is A1/A2>1.5.

[2] A honeycomb catalytic article according to the above [1], wherein A and B satisfy 5%<A/B<50% in the central portion in a thickness direction of the surface layer on the inlet side.

[3] A honeycomb catalytic article according to the above [1] or [2], wherein A satisfies 5%<A<80% in an image shot from the direction perpendicular to the surface of the surface of the surface layer on the inlet side.

[4] A honeycomb catalytic article according to any one of the above [1] to [3], wherein the surface layer has a peak pore size, constituting a peak of a pore distribution after loading of a catalyst, of 0.3 μm or more and below 10 μm and a porosity of 40% or more and below 95%.

[5] A honeycomb catalytic article according to anyone of the above [1] to [4], wherein the thickness L1 of the surface layer is 3% or more and below 15% of the thickness L2 of the partition walls.

[6] A honeycomb catalytic article according to any one of the above [1] to [5], wherein the partition wall matrix has an average pore size of 9 μm or more and below 60 μm and a porosity of 28% or more and below 50%.

[7] A honeycomb catalytic article according to any one of the above [1] to [6], wherein the partition wall matrix contains at least one kind selected from the group consisting of cordierite, Si-bonded SiC, recrystallized SiC, aluminum titanate, mullite, silicon nitride, sialon, zirconium phosphate, zirconia, titania, alumina, and silica as a main component.

[8] A honeycomb catalytic article according to any one of the above [1] to [7], wherein the partition wall matrix and the surface layer contain the same material as a main component.

[9] A honeycomb catalytic article according to any one of the above [1] to [8], wherein a catalyst containing one of or both platinum and palladium is loaded on the surface layer.

A honeycomb catalytic article of the present invention exhibits the following effects by being used as a DPF.

A honeycomb catalytic article of the present invention is provided with a porous partition wall matrix and a surface layer provided on only the inflow side or each of the inflow side and the outflow side of the partition wall matrix. The relation between a catalyst area proportion A of the catalyst to a gap area proportion B of a gap in a cross-section of the surface layer on the inlet side is 1%<A/B<90%, and the relation between an average catalyst area proportion A1 from the surface to a point having a depth of one third of the thickness of the surface layer including the surface of the surface layer on the inlet side and a catalyst area proportion A2 in a central portion of the surface layer is A1/A2>1.5. Therefore, with maintaining the PM trapping efficiency in a good state, it is possible that no rapid rise of pressure loss right after the start of trapping PM (initial stage of PM deposition) is caused (solution to the aforementioned problem (a)), the relation between PM deposition amount and pressure loss has no hysteresis characteristic (solution to the aforementioned problem (b)), and pressure loss in an early stage having no PM deposition is suppressed (solution to the aforementioned problem (c)) in addition to the period of PM deposition.

Since, in a preferable mode of a honeycomb catalytic article of the present invention, the surface layer has a peak pore size of 0.3 μm or more and below 10 μm and a porosity of 40% or more and below 95%, it is superior to the case without such limitations from the viewpoints of maintaining good PM trapping efficiency, inhibition of rapid rise of pressure loss right after the start of trapping PM, reducing pressure loss upon PM deposition, and durability of the surface layer.

Since, in a preferable mode of a honeycomb catalytic article of the present invention, the thickness L1 of the surface layer is 3% or more and below 15% of the thickness L2 of the partition walls, it is particularly excellent in that pressure loss upon PM deposition and in an initial state where no PM deposits can be suppressed to be low.

Since, in a preferable mode of a honeycomb catalytic article of the present invention, the partition wall matrix contains at least one kind selected from the group consisting of cordierite, Si-bonded SiC, recrystallized SiC, aluminum titanate, mullite, silicon nitride, and sialon as the main component, it is excellent in thermal stability under high temperature conditions.

Since, in a preferable mode of a honeycomb catalytic article of the present invention, the partition wall matrix and the surface layer contain the same material as the main component, there is no difference in thermal expansion between the partition wall matrix and the surface layer, thereby the surface layer is hardly peeled off (the aforementioned problem (d) is solved).

Since, in a preferable mode of a honeycomb catalytic article of the present invention, a (an oxidation) catalyst containing one of or both platinum and palladium is loaded on the surface layer, oxidation of PM deposited can be accelerated. Specifically, since the surface layer has higher porosity than that of the partition wall matrix to have a larger surface area, by loading an oxidation catalyst on the surface area, it becomes possible to raise a contact frequency between the catalyst and the PM in comparison with the conventional case of loading a catalyst in pores of the partition wall matrix to accelerate oxidation of the PM deposited more, and, as a result, the PM deposition amount can be maintained to be low, thereby reducing pressure loss upon PM deposition.

REFERENCE NUMERALS

1: honeycomb catalytic article, 2a, 2b: end face, 3: cell, 4: partition wall matrix, 10: plugging portion, 14: partition wall, 20: outer peripheral wall, 24: surface layer, 50: honeycomb structure

DETAILED DESCRIPTION OF THE INVENTION

Hereinbelow, embodiments of the present invention will be described with appropriately referring to drawings. However, the present invention should not be construed by being limited to these. Various changes, modifications, improvements, and substitutions may be added on the basis of knowledge of a person of ordinary skill within the range of not impairing the gist of the present invention. For example, the drawings show preferable embodiments of the present invention. However, the present invention is by no means limited by the modes represented in the drawings or information shown in the drawings. Upon carrying out or investigating the present invention, the same means as or a means equivalent to the means described in the present specification can be applied. However, a suitable means is a means described below.

Figure 1:
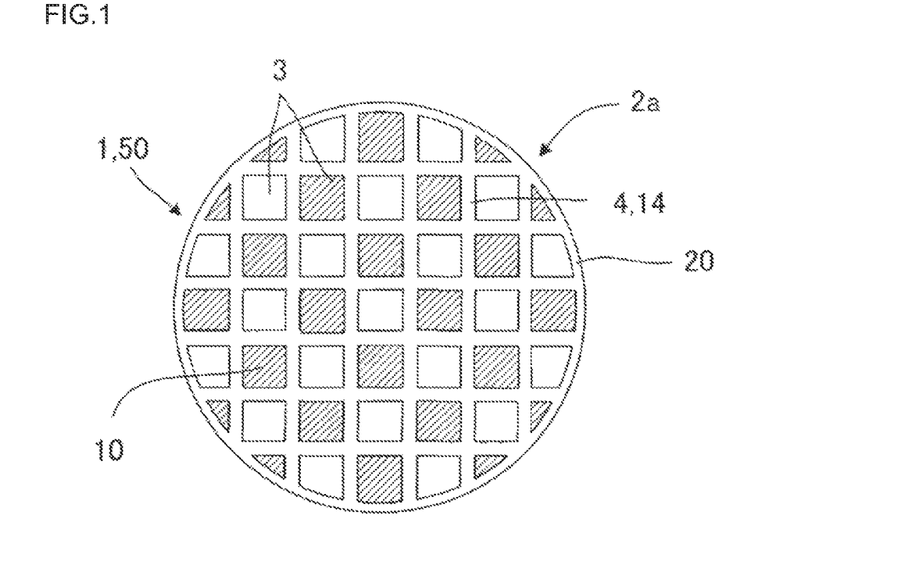
FIG. 1 is a front view schematically showing one embodiment of a honeycomb catalytic article of the present invention.
Figure 2:
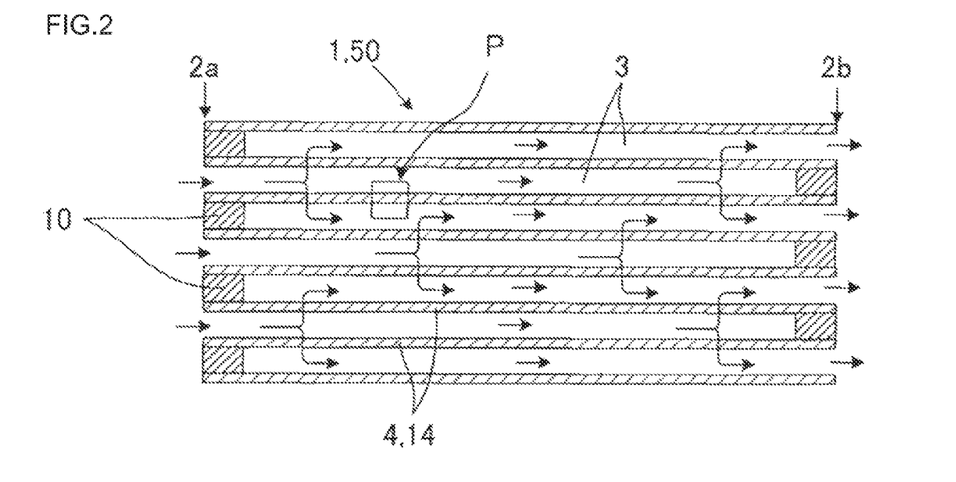
FIG. 2 is a cross-sectional view schematically showing one embodiment of a honeycomb catalytic article of the present invention.
Figure 3A:
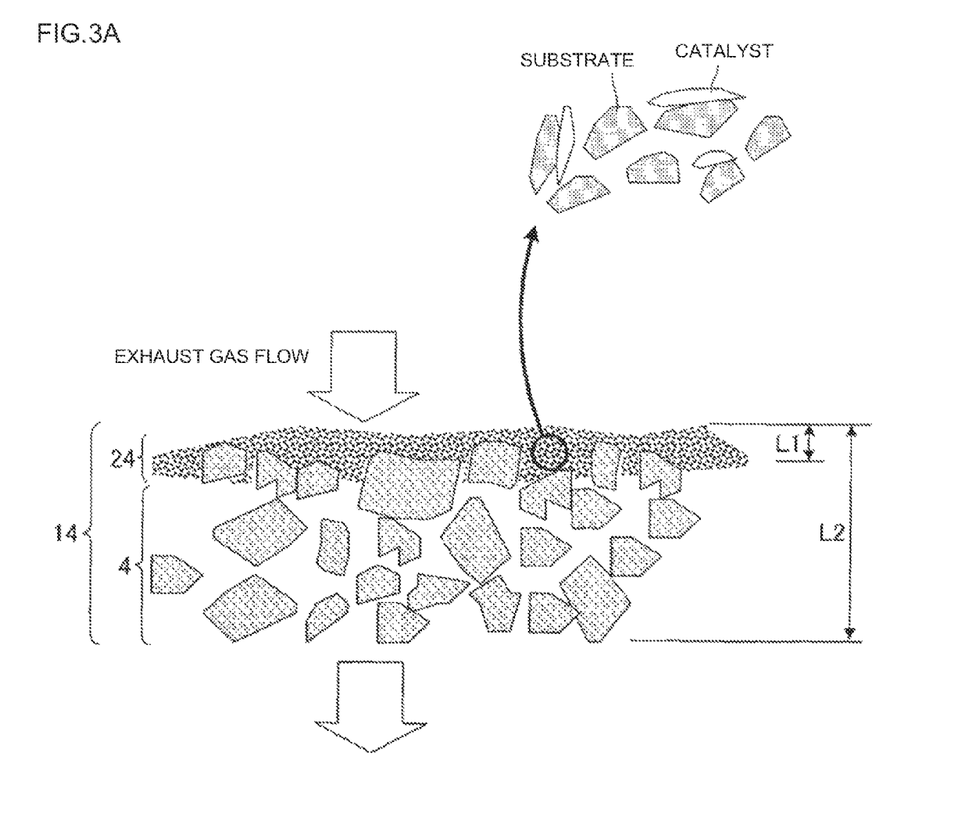
FIG. 3A is a partial cross-sectional view showing the enlarged P portion in FIG. 2.

FIG. 1 is a front view schematically showing one embodiment of a honeycomb catalytic article of the present invention. FIG. 2 is a cross-sectional view schematically showing one embodiment of a honeycomb catalytic article of the present invention. FIG. 3A is a partial cross-sectional view showing the enlarged P portion in FIG. 2. Incidentally, the surface layer is omitted in FIGS. 1 and 2.

A honeycomb catalytic article 1 shown in FIGS. 1 to 3A is an article where, in a honeycomb structure 50 provided with porous partition wall matrix 4 separating and forming a plurality of cells 3 functioning as fluid passages in the inside surrounded by the outer peripheral wall 20, plugging portions 10 plugging end portions of cells 3 are formed, and a surface layer 24 is provided on only the inlet side (or inlet side and outlet side) of the partition wall matrix 4. That is, in the honeycomb catalytic article 1, the partition wall matrix 4 and the surface layer 24 constitute the partition walls 14.

The partition wall matrix 4 (partition walls 14) is disposed in such a manner that a plurality of cells 3 passing through between the two end faces 2a and 2b are formed. The plugging portions 10 are disposed so as to plug the cells 3 on one of the end faces 2a and 2b. The plugging portions 10 are present in such a manner that adjacent cells 3 are plugged in mutually opposite end portions (end portion on one of the end faces 2a and 2b). As a result, as shown in FIG. 1, each of the end faces of the honeycomb catalytic article 1 (honeycomb structure 50) shows a checkerwise pattern (hound's tooth check).

In a honeycomb catalytic article 1, upon use, the exhaust gas (fluid) flows into cells 3 from one end face 2a side (from an end portion where predetermined cells 3 are open (end portion on the end face 2a side)), passes through the partition walls 14 functioning as a filter layer from the side where the surface layer 24 is provided, and flows out to the cells 3 (the remaining cells 3) which are open on the other end face 2b side as a permeated fluid, and flows out to the outside from the other end face 2b side (the other end portion (end portion on the end face 2b side) of the remaining cells 3). When the exhaust gas passes through the partition walls 14, PM contained in the exhaust gas is trapped by the partition walls 14.

Incidentally, the outer peripheral wall 20 located in the outermost periphery of the honeycomb catalytic article 1 may be a unitarily formed wall formed unitarily with a portion constituted of the partition wall matrix 14 upon manufacturing (forming) or a cement coated wall formed with cement or the like after grinding the outer periphery of a portion constituted of the partition wall matrix 14 after the forming. In addition, though the honeycomb catalytic article 1 shows a state where plugging portions 10 are disposed so as to plug cells 3 on the end faces 2a and 2b, a honeycomb catalytic article of the present invention is not limited to one in such a disposition state of plugging, and plugging portions may be disposed in the inner portions of the cells. For prioritizing reduction in pressure loss over filtration performance, it is also possible to employ a mode where a part of the cells have no plugging portion.

The partition wall matrix is constituted of at least one kind selected from the group consisting of cordierite, Si-bonded SiC, recrystallized SiC, aluminum titanate, mullite, silicon nitride, sialon, zirconium phosphate, zirconia, titania, alumina, and silica as the main component.

The surface layer can be constituted of the same material as the partition wall matrix as the main component. It is preferable that the partition wall matrix and the surface layer contain the same material as the main component because there is no difference in thermal expansion between the partition wall matrix and the surface layer, thereby hardly causing peeling of the surface layer.

It is preferable that the density of the cells (cell density) of the honeycomb catalytic article 1 is 15 cells/cm$^2$ or more and below 65 cells/cm$^2$ and that the thickness of the partition walls 14 is 200 μm or more and below 600 μm. Since the pressure loss upon PM deposition is reduced more when the filtration area is larger, the higher cell density reduces the pressure loss upon PM deposition more. On the other hand, the initial pressure loss increases by reducing a hydraulic diameter of the cells. Therefore, the higher cell density is better from the viewpoint of reduction in pressure loss upon PM deposition, while the lower cell density is better from the viewpoint of reduction in initial pressure loss. The larger thickness of the partition walls 14 improves trapping efficiency more though it increases the initial pressure loss. In consideration of trade-off among the initial pressure loss, pressure loss upon PM deposition, and trapping efficiency; ranges for satisfying all of them are the ranges described above.

In the honeycomb catalytic article 1 (honeycomb structure 50), the thermal expansion coefficient in the communication direction of the cells 3 at 40 to 800° C. is preferably below $1.0 \times 10^{-6}$/° C., more preferably below $0.8 \times 10^{-6}$/° C., particularly preferably below $0.5 \times 10^{-6}$/° C. When the thermal expansion coefficient in the cell communication direction at 40 to 800° C. is below $1.0 \times 10^{-6}$/° C., the thermal stress generated when the honeycomb catalytic article 1 is exposed to high temperature exhaust gas can be suppressed to be within an allowable range to inhibit thermal stress fracture.

As shown in FIGS. 1 and 2, the whole shape of the honeycomb catalytic article 1 is a columnar shape (circular cylindrical shape), and the shape of the cells (the shape of a cross section cut along the radial direction of the honeycomb catalytic article 1 on the face perpendicular to the communication direction of the cells 3) is quadrangular. However, in a honeycomb catalytic article of the present invention, the whole shape and the cell shape are not particularly limited. For example, the whole shape may be an elliptic columnar shape, an oval columnar shape, a quadrangular prism shape, a triangular prism shape, or another polygonal prism shape, and the cell shape may be hexagonal, triangular, or the like.

In the honeycomb catalytic article 1, it is preferable that the thickness L1 of the surface layer 24 on the inlet side and the outlet side is 3% or more and below 15% of the thickness L2 of the partition walls 14 (see FIG. 3A). When the thickness L1 of the surface layer is below 3% of the thickness L2 of the partition walls, the effect in reducing pressure loss upon PM deposition may become small, while, when it is above 15%, initial pressure loss may increase.

Figure 3B:
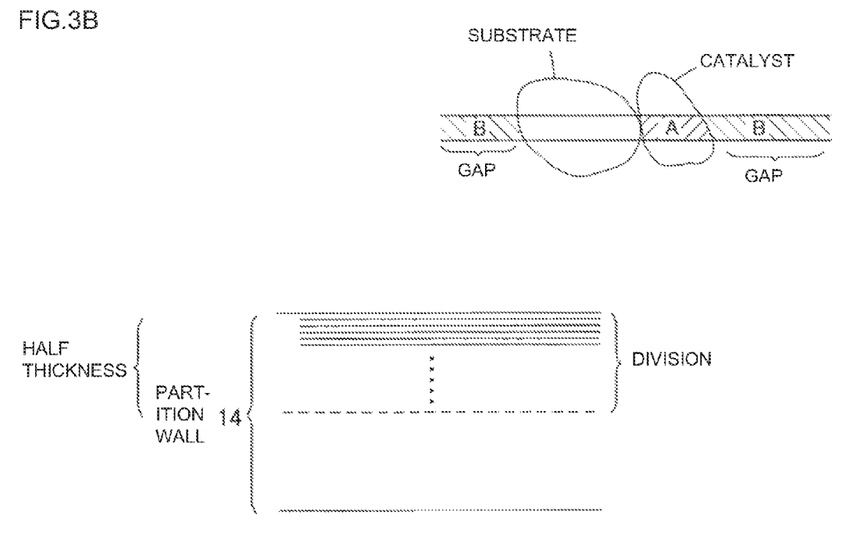
FIG. 3B is a schematic view for explaining about division of a cross section of a partition wall and measurement of area proportion.
Figure 4:
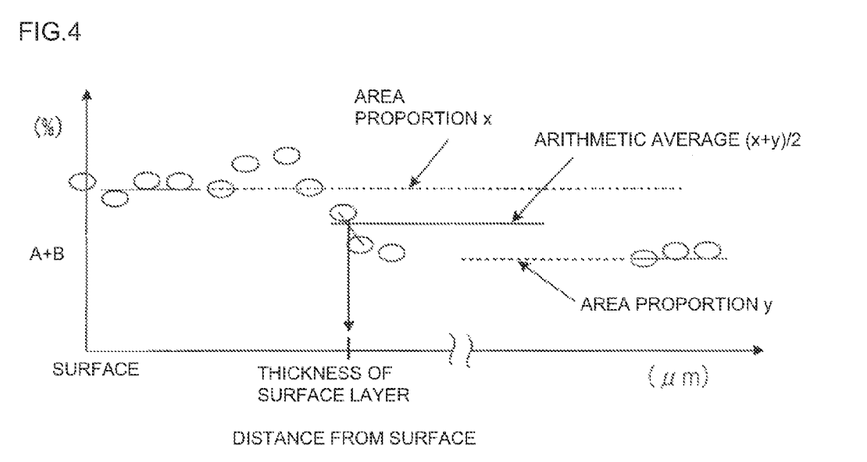
FIG. 4 is a graph showing the sum A+B of the catalyst area proportion A and the gap area proportion B based on the distance from the surface.

In the present specification, the thickness of the surface layer is defined as shown below. The image of a cross section of a partition wall of the honeycomb catalytic article is taken through a SEM. As shown in FIG. 3B, the region of half the thickness of the partition wall is divided into 1000 or more in the thickness direction (the number of pixels is selected to have a resolution higher than this resolution as the number of pixels for the image processing), and the sum A+B of the gap area proportion B and the catalyst area proportion A in each of the divided regions is measured on the image from the region closer to the surface to plot the average value of 20 visions for each distance from the surface as shown in FIG. 4. Then, the distance from the surface in the position where the straight line formed by the arithmetic average of A+B of the surface layer (referred to as area proportion x) and A+B of the partition wall matrix (referred to as area proportion y) intersects with the line obtained by connecting the aforementioned plotted points of the porosity (in other words, the distance from the surface corresponding with A+B of the aforementioned arithmetic average on the aforementioned line connecting the plotted points) is defined as the thickness of the surface layer.

In a honeycomb catalytic article of the present invention, it is preferable that a catalyst containing one of or both platinum and palladium is loaded on the surface layer. In this case, it is more preferable that, as a promoter, an oxide or the like having oxygen adsorbability such as ceria and zirconia is loaded.

Incidentally, in the honeycomb catalytic article 1, a catalyst is loaded on the inner pore surface of the surface layer and on the surface of the surface layer, and the relation between the catalyst area proportion A and the gap area proportion B in the surface layer cross section of the surface layer on the inlet side is 1%<A/B<90% in a central portion in a thickness direction of the surface layer. When it is below 1%, a catalyst function is insufficient, and a regeneration function of oxidizing and removing PM is insufficient to deteriorate regeneration efficiency. When it is above 90%, the flow rate in the layer becomes excessively high to cause deterioration in PM deposition pressure loss.

In the honeycomb catalytic article 1, it is preferable that the relation between an average catalyst area proportion A1 from the surface to a point having a depth of one third of the thickness of the surface layer including the surface of the surface layer on the inlet side and a catalyst area proportion A2 in a central portion of the surface layer is A1/A2>1.5.

PM enters from the surface layer side and is trapped more in the vicinity of the surface layer, and the PM trapping amount is smaller in the deeper position. Therefore, even if a large amount of a catalyst is present in a deep position apart from the surface layer, the catalyst is not used effectively. In the distribution where a larger amount of the catalyst is present in the vicinity of the surface layer where much PM is present, the PM amount and the catalyst amount are well-balanced in each portion, and the catalyst can effectively be used. Therefore, it is desirable that A1/A2 is above 1.5 on the inlet side. When it is below 1.5, the catalyst cannot be used effectively.

By thus specifying the catalyst area proportion and the gap area proportion and specifying catalyst area proportions A1 and A2, it is possible that no rapid rise of pressure loss right after the start of trapping PM (initial stage of PM deposition) is caused (solution to the aforementioned problem (a)), the relation between PM deposition amount and pressure loss has no hysteresis characteristic (solution to the aforementioned problem (b)), and pressure loss in an initial state (honeycomb catalytic article itself) having no PM deposition is suppressed (solution to the aforementioned problem (c)) in addition to the period of PM deposition.

Further, it is preferable that the relation between the catalyst area proportion A and the gap area proportion B is 5%<A/B<50% in the central portion in a thickness direction in a cross section of the surface layer on the inlet side.

In addition, it is preferable that A satisfies 5%<A<80% in an image of the surface of the surface layer on the inlet shot from the direction perpendicular to the surface of the surface of the surface layer on the inlet side. In other words, 5%<A<80% is preferable in an image of the outermost surface taken from above.

Figure 5:
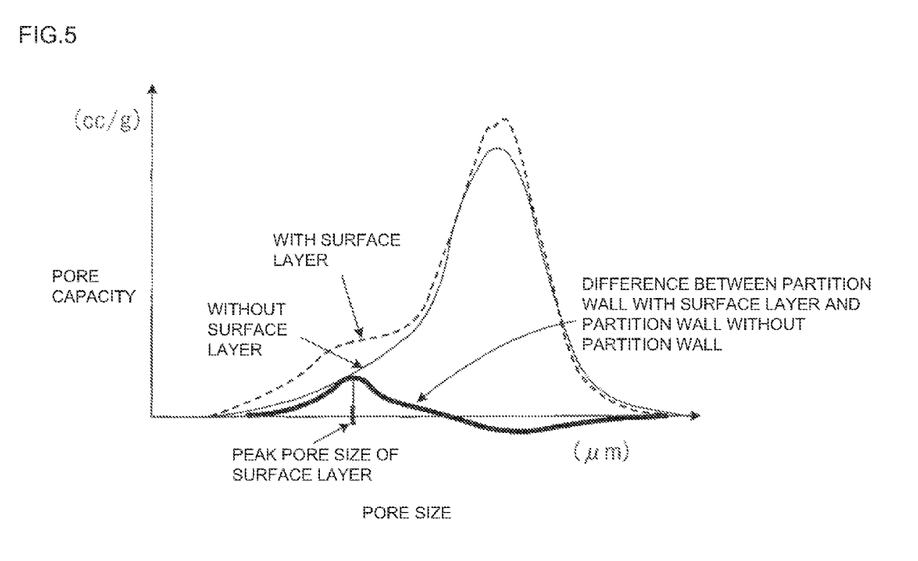
FIG. 5 is a graph showing a pore distribution obtained by mercury porosimetry of an embodiment of a honeycomb catalytic article of the present invention.

In the honeycomb catalytic article 1, the peak pore size of the surface layer 24 is equivalent to or smaller than the average pore size of the partition wall matrix 4. The peak pore size is a pore size constituting a peak of the pore distribution. In the present specification, the pore distribution of the pores of the partition wall matrix is shown by a value measured by mercury porosimetry. The pore distribution, the average pore size, and the pore diameter described later can be measured by the use of Porosimeter Model 9810 (trade name) produced by Shimadzu Corporation. FIG. 5 is a graph showing a pore distribution obtained by mercury porosimetry, which shows the relation between the pore capacity and the pore size. In the present specification, the peak pore size of the surface layer is defined by a peak of the difference between the measurement result of the pore distribution of the partition wall (having a surface layer) and the measurement result of the pore distribution of the partition wall (corresponding to the partition wall matrix with no surface layer) where the surface layer excluding a transition layer (interface between the surface layer and the partition wall matrix) with regarding the difference as the pore distribution of the surface layer (see FIG. 5).

In the surface layers on the inlet side and the outlet side of a honeycomb catalytic article of the present invention, it is preferable that the peak pore size after loading the catalyst is 0.3 μm or more and below 10 μm and that the porosity is 40% or more and below 95%. When the peak pore size is below 0.3 μm, the initial pressure loss when PM is not deposited may become excessive, while, when it is above 10 μm, the trapping efficiency may be deteriorated. When the porosity is 40% or more, the effect in reducing pressure loss upon PM deposition is large, while, when it is 95% or more, it is difficult to produce a surface layer having durability.

In the honeycomb catalytic article 1, the average pore size of the partition wall matrix 4 is 9 μm or more and below 60 μm. In the present specification, the average pore size of the partition wall matrix is a value measured by mercury porosimetry. The average pore size of the partition wall matrix 4 can be obtained by cutting out a partition wall, removing the surface layer by grinding, and measuring the remaining portion (corresponding to the partition wall matrix).

In the honeycomb catalytic article 1, the porosity of the surface layer 24 is higher than that of the partition wall matrix 4. In the present specification, the porosity is a value measured by a water dipping method and represented by volume % (represented simply by % in the present specification). The porosity of the partition wall matrix can be obtained by cutting out a partition wall, removing the surface layer by grinding, and measuring the remaining portion (corresponding to the partition wall matrix).

Next, a method for manufacturing a honeycomb catalytic article of the present invention will be described. In a method for manufacturing a honeycomb catalytic article of the present invention, for example, when the aforementioned honeycomb catalytic article 1 is manufactured, a honeycomb structure 50 is manufactured in advance as a fired article. It is preferable in the honeycomb structure (honeycomb structure 50) that, before providing the surface layer, end portions of cells 3 are plugged with plugging portions 10 to manufacture a plugged honeycomb structure. There is no limitation on the means to obtain the honeycomb structure (plugged honeycomb structure). The honeycomb structure can be manufactured by, for example, the following method.

In the first place, using raw materials among the materials described as materials for the partition wall matrix of a honeycomb catalytic article, the raw materials are mixed and kneaded to form kneaded clay. For example, when a cordierite is used as the material for the partition wall matrix, a dispersion medium such as water and a pore former are added to a cordierite forming raw material, and an organic binder and a dispersant are further added to the mixture, which is then kneaded to form clayey kneaded clay. There is no particular limitation on the means for preparing the kneaded clay by kneading a cordierite forming raw material (forming raw material), and a method using, for example, a kneader or a vacuum kneader may be employed.

A cordierite forming raw material means a raw material which forms cordierite by firing and ceramic raw material where silica, alumina, and magnesia are blended to give a chemical composition of 42 to 56 mass %, 30 to 45 mass %, and 12 to 16 mass %, respectively. Specifically, a material containing a plurality of inorganic raw materials selected from the group consisting of talc, kaolin, calcined kaolin, alumina, aluminum hydroxide, and silica so as to have the aforementioned chemical composition may be employed. Any pore former can be employed as long as it has a characteristic of scattering and disappearing in the firing step, and an inorganic substance such as coke, a polymer compound such as a resin balloon, an organic substance such as starch, and the like can be used alone or in combination. Examples of the organic binder can include hydroxypropylmethyl cellulose, methyl cellulose, hydroxyethyl cellulose, carboxymethyl cellulose, and polyvinyl alcohol. These may be used alone or in combination of two or more kinds. Examples of the dispersant can include ethylene glycol, dextrin, fatty acid soap, and polyalcohol. These may be used alone or in combination of two or more kinds.

Next, the kneaded clay obtained above is formed into a honeycomb shape to manufacture a honeycomb formed article. There is no particular limitation on the method for manufacturing a honeycomb formed article, and a known method such as extrusion forming, injection forming, and press forming can be employed. Of these, a suitable example is a method of extrusion forming the kneaded clay prepared as described above by the use of a die having a desired cell shape, partition wall thickness, and cell density.

Next, for example, both the end portions of the honeycomb formed article obtained above are subjected to plugging. As the material for the plugging portion, there can be used at least one material selected from the aforementioned materials for the partition wall matrix. For example, plugging slurry containing a cordierite forming raw material, water or alcohol, and an organic binder is stored in a container, and cells are alternately covered with a mask in a checkerwise pattern (hound's tooth check) on one end face of the honeycomb formed article. Then, the end portion on the end face side with the mask is immersed in the slurry to fill the plugging slurry into the cells with no mask to form plugging portions (plugging portions 10). Regarding the other end portion, a mask is applied to the cells plugged on the one end portion to form plugging portions in the same manner as in the aforementioned formation of the plugging portions on the one end portion. Thus, in the honeycomb formed article, the cells open (unplugged) in the one end portion are plugged in the other end portions to have a structure where the cells are alternately plugged in a checkerwise pattern in both the one end portion and the other end portion.

Next, the plugged honeycomb formed article is dried to manufacture a honeycomb dried article. There is no particular limitation on the means of drying, and there may be employed a conventionally known drying method such as hot air drying, microwave drying, dielectric drying, reduced pressure drying, vacuum drying, and freeze drying. Of these, a drying method of a combination of hot air drying and microwave drying or dielectric drying is preferable in that the whole formed article can be dried quickly and uniformly.

Next, the honeycomb dried article obtained above is calcined before the main firing to manufacture a calcined article. Calcination means an operation of combusting and removing organic substances (organic binder, dispersant, pore former, and the like) in the honeycomb formed article. Generally, the combustion temperature of an organic binder is about 100 to 300° C., and the combustion temperature of a pore former is about 200 to 800° C. Therefore, the calcination temperature may be about 200 to 1000° C. Though there is no particular limitation on the calcination time, it is generally about 10 to 100 hours.

Next, the calcined article obtained above is fired (main firing) to obtain a (plugged) honeycomb structure. In the present invention, the main firing means an operation for securing predetermined strength by sintering the forming raw material in the calcined article for densification. The firing conditions (temperature and hours) differs depending on the kind of the forming raw material, and, therefore, suitable conditions may be selected according to the kind. In the case of firing a cordierite forming raw material, firing at 1410 to 1440° C. is preferable. In addition, firing for about 3 to 10 hours is preferable.

After the plugged honeycomb structure is obtained, a surface layer 24 is provided on (only) the inlet side of the partition wall matrix 4 by a method for manufacturing a honeycomb catalytic article as described below to obtain a honeycomb catalytic article 1.

In a honeycomb catalytic article of the present invention, it is preferable that a catalyst containing one of or both platinum and palladium is loaded on the surface layer. In this case, it is more preferable that, as a promoter, an oxide or the like having oxygen adsorbability such as ceria and zirconia is loaded.

As described above, after a honeycomb structure provided with a porous partition wall matrix separating and forming a plurality of cells functioning as fluid passages is manufactured as a fired article in advance, slurry is obtained by mixing at least one kind of membrane-forming raw material selected from the group consisting of SiC, cordierite, aluminotitanate, aluminosilicate, silica, alumina, mullite, and glass as a raw material powder having an average particle size of below 10 µm, an adhesive material containing as the main component silica or alumina solidified by drying, an organic binder, and water or alcohol, and the slurry is deposited on only the inlet side or both the inlet side and the outlet side of the partition wall matrix, followed by drying or drying and firing to form a surface layer on only the inlet side or both the inlet side and the outlet side of the partition wall matrix. As the pore former, a colloid particle of a polymer organic substance which is removed by firing may be mixed in the slurry. Any pore former can be used as long as it scatters and disappears in the firing step, and a polymer compound such as carbon and a resin balloon, an organic substance such as starch, and the like can be used alone or in combination. Examples of the organic binder include hydroxypropylmethyl cellulose, methyl cellulose, hydroxyethyl cellulose, carboxymethyl cellulose, and polyvinyl alcohol.

In a method for manufacturing a honeycomb catalytic article of the present invention, upon depositing the slurry on only the inlet side or both the inlet side and the outlet side of the partition wall matrix, the slurry may be allowed to flow or sucked into the cell structure. Meanwhile, it is preferable that slurry is atomized with an atomizer to be sucked with air from end portions of cells of the honeycomb structure.

In a method for manufacturing a honeycomb catalytic article of the present invention, the slurry forming a surface layer after drying or drying and firing is sometimes referred to as slurry for the surface layer. In particular, as the pore former which is mixed in the slurry for the surface layer and which satisfies the aforementioned conditions, an organic substance such as coke, a polymer compound such as a resin balloon, and an organic substance such as starch can be used alone or in combination. These can be used also as a pore former used upon manufacturing a honeycomb formed article (partition wall matrix) in a method for manufacturing a honeycomb catalytic article of the present invention.

In a method for manufacturing a honeycomb catalytic article of the present invention, the average particle size of the pore former is preferably below 5 μm. In a method for manufacturing a honeycomb catalytic article of the present invention, it is more preferable that the average particle size of the pore former is below 3 μm.

In a method for manufacturing a honeycomb catalytic article of the present invention, it is preferable that the percentage of the pore former in the raw material solid content is 70 mass % or more and below 80 mass %.

EXAMPLE

Hereinbelow, the present invention will be described more specifically by Examples. However, the present invention is by no means limited to these Examples.

Examples 1 to 15, Comparative Examples 1 to 4

[Manufacture of honeycomb formed article] As the cordierite forming raw material, alumina, aluminum hydroxide, kaolin, talc, and silica were used; and, to 100 parts by mass of the cordierite forming raw material were added 13 parts by mass of a pore former, 35 parts by mass of a dispersion medium, 6 parts by mass of an organic binder, and 0.5 parts by mass of a dispersant, followed by mixing and kneading to them prepare kneaded clay. Water was used as the dispersion medium, coke having an average particle size of 10 μm was used as the pore former, hydroxypropylmethyl cellulose was used as the organic binder, and ethylene glycol was used as the dispersant. Then, the kneaded clay was subjected to extrusion forming using a predetermined die to obtain a honeycomb formed article having a quadrangle cell shape and a circular columnar (circular cylindrical) whole shape.

[Manufacture of plugged honeycomb structure] After the honeycomb formed article was subjected to drying with a microwave dryer and further drying with a hot air dryer for complete drying, both the end faces of the honeycomb formed article were cut to have a predetermined size. Then, a mask was alternately applied in a checkerwise pattern (hound's tooth check) in cell opening portion on one end face of the honeycomb formed article, and the end portion having the mask applied thereon was immersed in plugging slurry containing the cordierite forming raw material to form plugging portions alternately disposed in a checkerwise pattern. Regarding the other end portion, a mask was applied to the cells plugged on the one end portion to form plugging portions in the same manner as in the aforementioned formation of the plugging portions on the one end portion. Then, a honeycomb formed article having plugging portions was dried with a hot air drier and then fired at 1410 to 1440° C. for 5 hours to obtain a plugged honeycomb structure.

[Formation of surface layer (manufacture of honeycomb catalytic article)] A cordierite forming raw material having an average particle size of 3 μm as the membrane-forming raw material, cellulose as the organic binder, and carbon having an average particle size of 4 μm as the pore former were used at a mass ratio of 90:10:5 so as to have 100 g in mass as a whole, which were then mixed with water of five liters to obtain slurry for the surface layer. Then, the slurry was sucked from one end of the plugged honeycomb structure obtained above to be deposited on the inlet side of the partition wall matrix of the plugged honeycomb structure. Then, drying was performed at 130° C. for one hour, followed by firing at 1410° C. for one hour to obtain a honeycomb structure where a surface layer is provided with a plugged honeycomb structure. Incidentally, Comparative Example 1 is a sample with no surface layer.

[Loading of catalyst] There was prepared catalyst slurry containing platinum (Pt) as a noble metal, active alumina, and ceria as an oxygen adsorber. By a sucking method, a coat layer of the catalyst slurry prepared above was formed on the inner surfaces of the partition walls and inner surfaces of the pores of each of the honeycomb structures in Examples. Next, by heat-drying, a honeycomb catalytic article having the pore structure of partition walls (with a catalyst layer) shown in Table 1 was manufactured. Incidentally, the amount of the noble metal (Pt) per liter of the honeycomb structure (carrier) was 2 g. In addition, the coat amount of the catalyst slurry per liter of the honeycomb structure (carrier) was 100 g.

TABLE 1

|  | Cell density (cells/cm²) | Partition wall thickness L2 (μm) | Surface layer thickness L1 (μm) | L1/L2 (%) | Pore properties after loading catalyst ||||
|---|---|---|---|---|---|---|---|---|
|  |  |  |  |  | Peak pore size of surface layer (μm) | Porosity of surface layer (%) | Average pore size of partition wall matrix (μm) | Porosity of partition wall matrix (%) |
| Example 1 | 46.5 | 300 | 30 | 10 | 3 | 70 | 25 | 52 |
| Example 2 | 46.5 | 300 | 39 | 13 | 8 | 65 | 25 | 52 |
| Example 3 | 46.5 | 300 | 84 | 28 | 14 | 57 | 25 | 52 |
| Example 4 | 46.5 | 300 | 30 | 10 | 8 | 70 | 11 | 42 |
| Example 5 | 46.5 | 300 | 30 | 10 | 8 | 70 | 55 | 63 |
| Example 6 | 46.5 | 300 | 30 | 10 | 8 | 70 | 25 | 52 |

TABLE 1-continued

| | | | | | | | | |
|---|---|---|---|---|---|---|---|---|
| Example 7 | 46.5 | 300 | 30 | 10 | 8 | 70 | 25 | 52 |
| Example 8 | 46.5 | 300 | 30 | 10 | 8 | 70 | 25 | 52 |
| Example 9 | 46.5 | 300 | 30 | 10 | 8 | 70 | 25 | 52 |
| Example 10 | 46.5 | 300 | 39 | 13 | 8 | 65 | 25 | 52 |
| Example 11 | 46.5 | 300 | 39 | 13 | 8 | 65 | 25 | 52 |
| Example 12 | 46.5 | 300 | 60 | 20 | 14 | 57 | 25 | 52 |
| Example 13 | 46.5 | 300 | 66 | 22 | 14 | 57 | 25 | 52 |
| Example 14 | 46.5 | 300 | 84 | 28 | 14 | 55 | 25 | 52 |
| Example 15 | 46.5 | 300 | 84 | 28 | 14 | 57 | 45 | 52 |
| Comp. Ex. 1 | 46.5 | 300 | 0 | 0 | — | — | 25 | 52 |
| Comp. Ex. 2 | 46.5 | 300 | 30 | 10 | 8 | 70 | 25 | 52 |
| Comp. Ex. 3 | 46.5 | 300 | 30 | 10 | 8 | 70 | 25 | 52 |
| Comp. Ex. 4 | 46.5 | 300 | 30 | 10 | 8 | 70 | 25 | 52 |

| | Surface layer thickness central portion | | | Surface of surface layer | Catalyst distribution in depth direction | | |
|---|---|---|---|---|---|---|---|
| | Catalyst area proportion A | Gap area proportion B | A/B | Catalyst area proportion A3 | Catalyst area proportion up to depth of 1/3 of surface layer thickness A1 | Catalyst area proportion in surface layer central portion A2 | A1/A2 |
| Example 1 | 0.02 | 0.68 | 3% | 0.1 | 0.1 | 0.02 | 5.00 |
| Example 2 | 0.3 | 0.35 | 86% | 0.6 | 0.5 | 0.3 | 1.67 |
| Example 3 | 0.25 | 0.32 | 78% | 0.6 | 0.5 | 0.25 | 2.00 |
| Example 4 | 0.3 | 0.4 | 75% | 0.6 | 0.5 | 0.3 | 1.67 |
| Example 5 | 0.2 | 0.5 | 40% | 0.8 | 0.6 | 0.2 | 3.00 |
| Example 6 | 0.2 | 0.5 | 40% | 0.8 | 0.6 | 0.2 | 3.00 |
| Example 7 | 0.2 | 0.5 | 40% | 0.8 | 0.5 | 0.2 | 2.50 |
| Example 8 | 0.2 | 0.5 | 40% | 0.8 | 0.4 | 0.2 | 2.00 |
| Example 9 | 0.2 | 0.5 | 40% | 0.8 | 0.4 | 0.2 | 2.00 |
| Example 10 | 0.2 | 0.45 | 44% | 0.3 | 0.3 | 0.2 | 1.50 |
| Example 11 | 0.2 | 0.45 | 44% | 0.4 | 0.4 | 0.2 | 2.00 |
| Example 12 | 0.2 | 0.37 | 54% | 0.4 | 0.4 | 0.2 | 2.00 |
| Example 13 | 0.24 | 0.33 | 73% | 0.4 | 0.4 | 0.24 | 1.67 |
| Example 14 | 0.2 | 0.35 | 57% | 0.4 | 0.35 | 0.2 | 1.75 |
| Example 15 | 0.2 | 0.37 | 54% | 0.4 | 0.35 | 0.2 | 1.75 |
| Comp. Ex. 1 | | | | | | | |
| Comp. Ex. 2 | 0.005 | 0.68 | 0.7% | 0.04 | 0.02 | 0.005 | 4.00 |
| Comp. Ex. 3 | 0.4 | 0.3 | 133% | 0.8 | 0.4 | 0.2 | 2.00 |
| Comp. Ex. 4 | 0.2 | 0.5 | 40% | 0.8 | 0.22 | 0.2 | 1.10 |

[Evaluation of honeycomb catalytic article] The honeycomb catalytic articles obtained above had a circular columnar shape (circular cylindrical shape) having a diameter of 144 mm and a length of 152 mm. Each of the honeycomb catalytic articles obtained by loading a catalyst on the surface of each honeycomb catalytic article was measured for the surface layer thickness L1, partition wall thickness L2, peak pore size of the surface layer, porosity of the surface layer, average pore size of the partition wall matrix, porosity of the partition wall matrix, surface layer thickness and mass in each portion on the inlet side, in the center, and on the outlet side by the following methods; and each of the honeycomb catalytic articles was evaluated for initial trapping efficiency, pressure loss upon PM deposition, pressure loss increase rate, and hysteresis characteristic. The results are shown in Table 2 with the comprehensive evaluations. Incidentally, in the comprehensive evaluations, the honeycomb catalytic articles obtaining good evaluations (described later) for all of the initial trapping efficiency, pressure loss upon PM deposition, pressure loss increase rate, and hysteresis characteristic were evaluated as good; and the others were evaluated as bad. The average pore diameter, pore distribution, and porosity were measured by the use of Porosimeter Model 9810 (trade name) produced by Shimadzu Corporation.

TABLE 2

| | Regeneration time | | Initial trapping efficiency | | Pressure loss upon PM deposition | | Initial pressure loss increase rate | | Hysteresis characteristic | | comprehensive evaluation |
|---|---|---|---|---|---|---|---|---|---|---|---|
| | Evaluation | (min) | Evaluation | (%) | Evaluation | — | Evaluation | (%) | Evaluation | (%) | evaluation |
| Example 1 | Good | 20 | Good | 99 | Good | 0.2 | Good | 3 | Good | 3 | Good |
| Example 2 | Good | 25 | Good | 99 | Good | 0.4 | Good | 1.5 | Good | 1 | Good |
| Example 3 | Good | 26 | Good | 90 | Good | 0.4 | Good | 0.2 | Good | 3 | Good |
| Example 4 | Good | 26 | Good | 99 | Good | 0.4 | Good | 1.5 | Good | 3 | Good |
| Example 5 | Good | 20 | Good | 99 | Good | 0.2 | Good | 1.5 | Good | 3 | Good |
| Example 6 | Good | 19 | Good | 95 | Good | 0.3 | Good | 1.5 | Good | 3 | Good |
| Example 7 | Good | 19 | Good | 95 | Good | 0.3 | Good | 1.5 | Good | 5 | Good |
| Example 8 | Good | 18 | Good | 90 | Good | 0.4 | Good | 1.5 | Good | 18 | Good |
| Example 9 | Good | 18 | Good | 85 | Good | 0.45 | Good | 1.5 | Good | 20 | Good |
| Example 10 | Good | 18 | Good | 80 | Good | 0.45 | Good | 1.5 | Good | 22 | Good |

TABLE 2-continued

| | Evaluation result | | | | | | | | | |
|---|---|---|---|---|---|---|---|---|---|---|
| | Regeneration time | | Initial trapping efficiency | | Pressure loss upon PM deposition | | Initial pressure loss increase rate | | Hysteresis characteristic | | comprehensive |
| | Evaluation | (min) | Evaluation | (%) | Evaluation | — | Evaluation | (%) | Evaluation | (%) | evaluation |
| Example 11 | Good | 18 | Good | 99 | Good | 0.46 | Good | 1.5 | Good | 23 | Good |
| Example 12 | Good | 18 | Good | 94 | Good | 0.3 | Good | 1.5 | Good | 3 | Good |
| Example 13 | Good | 22 | Good | 95 | Good | 0.4 | Good | 1.5 | Good | 5 | Good |
| Example 14 | Good | 23 | Good | 85 | Good | 0.45 | Good | 6 | Good | 5 | Good |
| Example 15 | Good | 23 | Good | 85 | Good | 0.2 | Good | 0.2 | Good | 1 | Good |
| Comp. Ex. 1 | | | Bad | 30 | Bad | 1 | Good | 0 | Bad | 70 | Bad |
| Comp. Ex. 2 | Bad | 45 | Good | 90 | Good | 0.4 | Good | 1.5 | Bad | 70 | Bad |
| Comp. Ex. 3 | Good | 18 | Good | 90 | Bad | 0.8 | Good | 1.5 | Good | 18 | Bad |
| Comp. Ex. 4 | Bad | 40 | Good | 85 | Good | 0.45 | Good | 1.5 | Good | 20 | Bad |

[Porosity of partition wall matrix] The image of a cross section of a partition wall of each of the honeycomb catalytic articles was taken through a SEM (scanning electron microscope). In a position sufficiently apart from the surface of the partition wall (central portion in the thickness direction of the partition wall), the average space/solid area ratio in square 20 visions (a side of each square is 1/1000 of the partition wall thickness) was measured to obtain the porosity of the partition wall matrix.

[Porosity of surface layer] The image of a cross section of a partition wall of each of the honeycomb catalytic articles was taken through a SEM. From a position close to the surface of the partition wall, the average space/solid area ratio in square 20 visions (a side of each square is 1/1000 of the partition wall thickness) in each of the divided regions was measured to obtain the average at three points close to the surface except for the point closest to the surface, and the average was determined as the porosity of the surface layer.

[Partition wall thickness] The image of a cross section of a partition wall of each of the honeycomb catalytic articles was taken through a SEM to measure the partition wall thickness through the image.

[Surface layer thickness] The image of a cross section of a partition wall of each of the honeycomb catalytic articles was taken through a SEM, and the region of half the thickness of the partition wall was divided into 1000 or more in the thickness direction (the number of pixels was selected to have a resolution higher than this resolution as the number of pixels for the image processing), and the sum A+B of the gap area proportion B and the catalyst area proportion A in each of the divided regions was measured on the image from the region closer to the surface to plot the average value of 20 visions for each distance from the surface. Then, the distance from the surface in the position where the straight line formed by the arithmetic average of A+B of the surface layer and A+B of the partition wall matrix intersected with the line obtained by connecting the plotted points of the aforementioned porosity (in other words, the distance corresponding with A+B of the aforementioned arithmetic average on the aforementioned line connecting the plotted points) was defined as the thickness of the surface layer.

[Average pore size of partition wall matrix] The average pore size of the partition wall matrix was obtained by cutting out a partition wall from the honeycomb catalytic article, removing the surface layer by grinding, and measuring the remaining portion (corresponding to the partition wall matrix) for the average pore size.

[Peak pore size of surface layer] A partition wall was cut out from the honeycomb catalytic article, and the pore distribution of the partition wall was measured. Then, the surface layer was removed from the partition wall by grinding, and the pore distribution of the remaining portion (corresponding to the partition wall matrix) was measured. The difference in pore distribution between the partition wall and the portion obtained by removing the surface layer from the partition wall was regarded as the pore distribution of the surface layer, and the pore size forming the peak in the pore distribution was determined as the peak pore size of the surface layer. Incidentally, upon calculating the aforementioned difference, the calculation was made by conversion into a pore capacity per a sample capacity.

[Area ratio between catalyst and gap] An SEM image of a cross section perpendicular to the cell flow passage direction in a central portion in the longitudinal direction of the honeycomb catalytic articles was taken, and the threshold where the catalyst portion and the base material portion in the cross section can be distinguished by color or brightness was set to obtain the catalyst area proportion A and the gap area proportion B in the cross section of the surface layer by image processing and obtain the A/B value in the central portion in the surface layer thickness direction. In addition, a partition wall in the central portion in the longitudinal direction of the honeycomb catalytic article was cut out, and the threshold where the catalyst portion and the base material portion in the cross section can be distinguished by color or brightness in the micrograph taken from the direction perpendicular to the partition wall surface was set to obtain the catalyst area proportion A3 on the surface of the surface layer. On the other hand, an SEM image of a cross section along a plane perpendicular to the cell flow passage direction was taken to obtain the catalyst area proportion A1 from the surface layer to the depth of ⅓ of the surface layer thickness by image processing. The catalyst area proportion A2 in the central portion of the surface layer was obtained from the ratio of the proportions.

[Evaluation for regeneration time] After 6 g/L of soot per capacity of the honeycomb catalytic article was deposited on the honeycomb catalytic article in an engine exhaust system, the temperature of engine exhaust gas flowing into the honeycomb catalytic article was raised to 600° C., and time for maintaining the temperature at 600° C. was varied to check the remaining soot amount, thereby obtaining the relation between the time for maintenance of 600° C. and the regeneration efficiency: (initial soot amount−remaining soot amount)/initial soot amount, and the time spent until the regeneration efficiency reached 90% was defined as the regeneration time.

[Initial trapping efficiency] Under the conditions of a PM concentration of 1 mg/m$^3$, a temperature of 200° C., and a flow rate of 2.4 Nm/min, exhaust gas from a light oil burner was allowed to flow into a honeycomb catalytic article to measure the number of PM particles in the upstream (before the gas flowed into the honeycomb catalytic article) and in the downstream (after the gas flowed out from the honeycomb catalytic article) in the initial state before PM deposited on the honeycomb catalytic article. Then, the trapping efficiency was calculated out by the formula of ((number of PM particles in the upstream)−(number of PM particles in the downstream))/(number of PM particles in the upstream)×100. The number of PM particles was measured by counting PM particles by the use of SMPS (Scanning Mobility Particle Sizer) produced by TSI Incorporated. The initial trapping efficiency was evaluated as good for 80% or more and as bad for below 80%.

[Initial Pressure loss] Air having ordinary temperature was allowed to flow into the honeycomb catalytic article with no PM deposition at a flow rate of 8 Nm/min., and the difference in pressure between the upstream and the downstream of the honeycomb catalytic article was measured with a differential pressure gauge to obtain the initial pressure loss (not shown in Table 1).

[Pressure loss upon PM deposition] PM of 2 g/L per capacity was deposited on a honeycomb catalytic article with no PM deposition, and air at 200° C. was allowed to flow into the honeycomb catalytic article with PM deposited thereon at a flow rate of 2.4 Nm/min., and the difference in pressure between the upstream and the downstream of the honeycomb catalytic article was measured with a differential pressure gauge to obtain the pressure loss upon PM deposition (referred to as pressure loss A. See FIG. 6 described later). The pressure loss upon PM deposition shown in Table 1 is a relative value with regarding the result of Comparative Example 1 as 1. The pressure loss upon PM deposition was evaluated as good for below 0.5 and bad for 0.5 or more.

[Initial pressure loss increase rate] The initial pressure loss increase rate was calculated out by the formula of ((initial pressure loss)−(initial pressure loss of Comparative Example 1))/(initial pressure loss of Comparative Example 1)×100. The initial pressure loss increase rate was evaluated as good for below 10% and bad for 10% or more.

Figure 6:
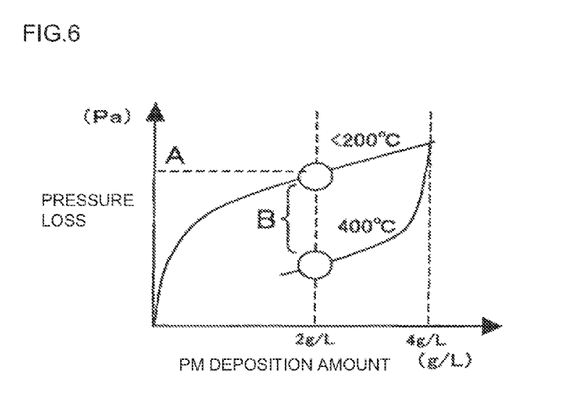
FIG. 6 is a graph showing a hysteresis characteristic of a honeycomb catalytic article of the present invention by showing a relation between the pressure loss and the PM deposition amount per capacity.

[Hysteresis characteristic] FIG. 6 is a graph showing a hysteresis characteristic of a honeycomb catalytic article by showing a relation between the pressure loss and the PM deposition amount per capacity. In the present Examples, after 4 g/L of PM was deposited on the honeycomb catalytic article at a temperature of 200° C., a part of PM was combusted at a temperature of 400° C. to obtain pressure loss when the PM was decreased to 2 g/L (referred to as pressure loss C). Then, the pressure loss difference B, which is a difference between the pressure loss A and the pressure loss C described above, was calculated out to show the ratio of the pressure loss difference B to the pressure loss A by %, which was defined as the hysteresis characteristic.

As shown in Table 2, it can be understood that the constitution of the present invention satisfies all of short regeneration time, high initial trapping efficiency, low pressure loss upon PM deposition, and small hysteresis and achieves the aim of the present invention.

A honeycomb catalytic article of the present invention can be used for removing particulate matter contained in exhaust gas discharged from internal combustion engines such as an automobile engine, a construction machine engine, and a stationary engine for industrial machines; burning appliances, and the like.

What is claimed is:

1. A honeycomb catalytic article comprising partition walls having:
a porous partition wall matrix separating and forming a plurality of cells functioning as fluid passages, and
a surface layer provided on only the inflow side or each of the inflow side and the outflow side of the partition wall matrix;
with predetermined cells each of which has an open end portion on one side and a plugged end portion on the other side and remaining cells each of which has a plugged end portion on the one side and an open end portion on the other side being alternately disposed, and a catalyst being loaded on surfaces of inner pores of the surface layer and on a surface of the surface layer;
wherein a relation between a catalyst area proportion A of the catalyst to a gap area proportion B of a gap in a cross-section of the surface layer on the inlet side is 1%<A/B<90% in a central portion in a thickness direction of the surface layer, and
a relation between an average catalyst area proportion A1 from the surface to a point having a depth of one third of the thickness of the surface layer including the surface of the surface layer on the inlet side and a catalyst area proportion A2 in a central portion of the surface layer is A1/A2>1.5.

2. A honeycomb catalytic article according to claim 1, wherein A and B satisfy 5%<A/B<50% in the central portion in a thickness direction of the surface layer on the inlet side.

3. A honeycomb catalytic article according to claim 2, wherein A satisfy 5%<A<80% in an image shot from the direction perpendicular to the surface of the surface layer on the inlet side.

4. A honeycomb catalytic article according to claim 3, wherein the surface layer has a peak pore size, constituting a peak of a pore distribution after loading of a catalyst, of 0.3 μm or more and below 10 μm and a porosity of 40% or more and below 95%.

5. A honeycomb catalytic article according to claim 4, wherein the thickness L1 of the surface layer is 3% or more and below 15% of the thickness L2 of the partition walls.

6. A honeycomb catalytic article according to claim 3, wherein the thickness L1 of the surface layer is 3% or more and below 15% of the thickness L2 of the partition walls.

7. A honeycomb catalytic article according to claim 2, wherein the surface layer has a peak pore size, constituting a peak of a pore distribution after loading of a catalyst, of 0.3 μm or more and below 10 μm and a porosity of 40% or more and below 95%.

8. A honeycomb catalytic article according to claim 7, wherein the thickness L1 of the surface layer is 3% or more and below 15% of the thickness L2 of the partition walls.

9. A honeycomb catalytic article according to claim 2, wherein the thickness L1 of the surface layer is 3% or more and below 15% of the thickness L2 of the partition walls.

10. A honeycomb catalytic article according to claim 1, wherein A satisfy 5%<A<80% in an image shot from a direction perpendicular to the surface of the surface layer on the inlet side.

11. A honeycomb catalytic article according to claim 10, wherein the surface layer has a peak pore size, constituting a peak of a pore distribution after loading of a catalyst, of 0.3 μm or more and below 10 μm and a porosity of 40% or more and below 95%.

12. A honeycomb catalytic article according to claim 11, wherein the thickness L1 of the surface layer is 3% or more and below 15% of the thickness L2 of the partition walls.

13. A honeycomb catalytic article according to claim 10, wherein the thickness L1 of the surface layer is 3% or more and below 15% of the thickness L2 of the partition walls.

14. A honeycomb catalytic article according to claim 1, wherein the surface layer has a peak pore size, constituting a peak of a pore distribution after loading of a catalyst, of 0.3 µm or more and below 10 µm and a porosity of 40% or more and below 95%.

15. A honeycomb catalytic article according to claim 14, wherein the thickness L1 of the surface layer is 3% or more and below 15% of the thickness L2 of the partition walls.

16. A honeycomb catalytic article according to claim 1, wherein the thickness L1 of the surface layer is 3% or more and below 15% of the thickness L2 of the partition walls.

17. A honeycomb catalytic article according to claim 1, wherein the partition wall matrix has an average pore size of 9 µm or more and below 60 µm and a porosity of 28% or more and below 50%.

18. A honeycomb catalytic article according to claim 1, wherein the partition wall matrix contains at least one kind selected from the group consisting of cordierite, Si-bonded SiC, recrystallized SiC, aluminum titanate, mullite, silicon nitride, sialon, zirconium phosphate, zirconia, titania, alumina, and silica as a main component.

19. A honeycomb catalytic article according to claim 1, wherein the partition wall matrix and the surface layer contain the same material as a main component.

20. A honeycomb catalytic article according to claim 1, wherein a catalyst containing one of or both platinum and palladium is loaded on the surface layer.

* * * * *